July 11, 1950 W. L. EDEL 2,515,081
CIRCULATING MEANS IN ABSORPTION REFRIGERATION
Filed April 15, 1946 2 Sheets-Sheet 2

INVENTOR.
Walter L. Edel

BY
ATTORNEYS

Patented July 11, 1950

2,515,081

UNITED STATES PATENT OFFICE 2,515,081

CIRCULATING MEANS IN ABSORPTION REFRIGERATION

Walter L. Edel, Detroit, Mich., assignor to Clayton & Lambert Manufacturing Company, Detroit, Mich., a corporation of Delaware Application April 15, 1946, Serial No. 662,146

5 Claims. (Cl. 62—119.5)

This invention relates to a generator, heat exchanger and circulator for absorption refrigeration.

In absorption refrigeration systems of the continuous type and with equalized pressure, it is necessary to provide some form of circulator or pump for the liquid flowing from the absorber to the generator and from generator to absorber. The usual practice is to provide a vapor lift pump in the generator and lift the weak liquor from the weak liquor zone in the generator to an elevated receptacle known as a separator. The liquor in the separator has to be elevated high enough to send the liquor therefrom to the top of the absorber by gravity. It has been thought necessary to provide a separator for the purpose of separating the large amount of vapor that is required in the vapor lift in order to make this form of pump suitable.

I have discovered that the separator can be eliminated and that the vapor lift tube can be passed through the contents of the boiler itself and then through a liquid heat exchanger and directly to the top of the absorber. By connecting the vapor lift tube directly with the hot weak liquor tube in the liquid heat exchanger I find that the vapors in the vapor lift line can be both condensed and absorbed in the cooled weak liquor before being discharged into the absorber and sufficient lifting effect obtained by reason of the difference in the specific gravity of the two fluid columns (the liquor in the boiler and the combined liquor and vapor in the vapor lift tube) to elevate the weak liquor to the top of the absorber, provided that elevation is within reasonable limits above the elevation of the liquor in the boiler.

Figure 1:
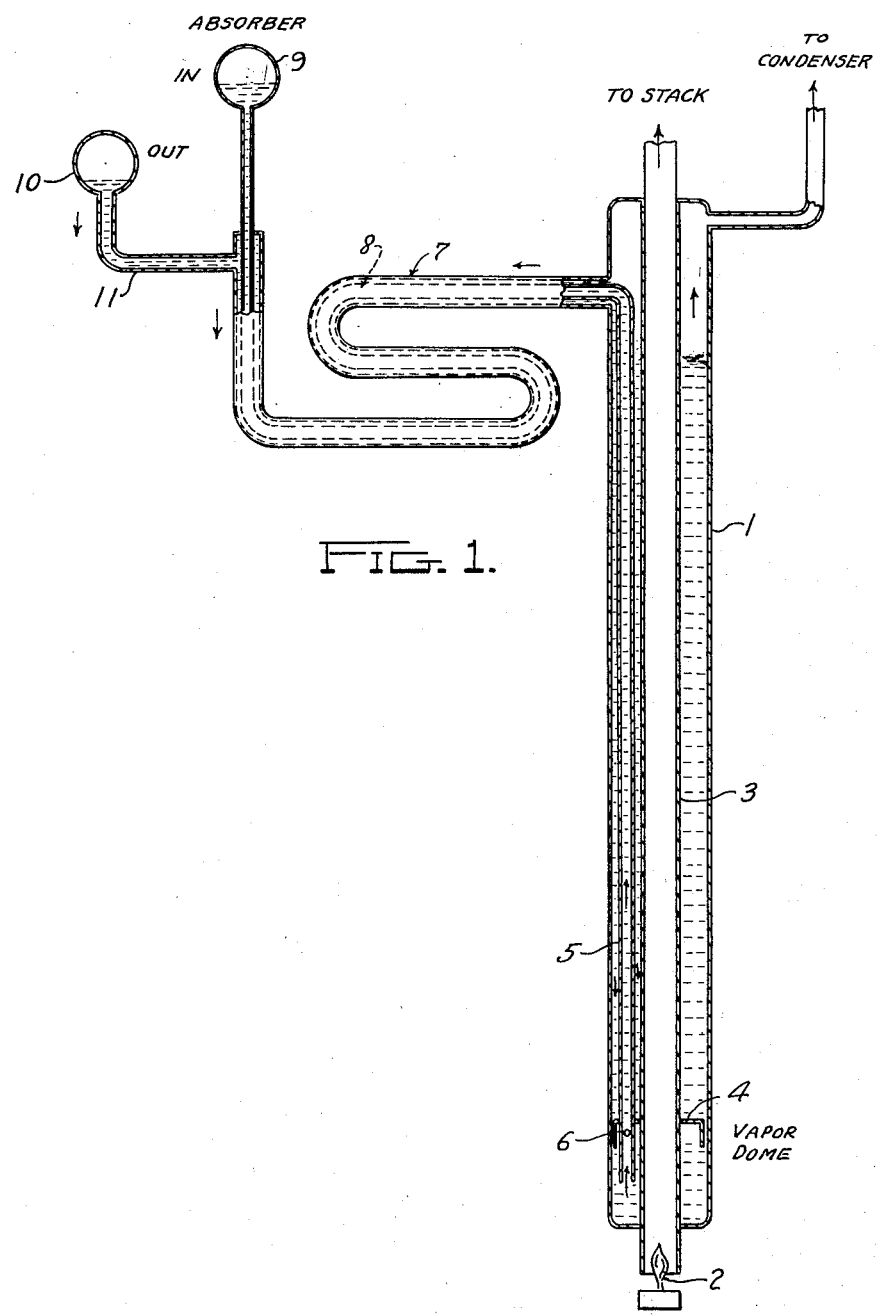
Fig. 1 is a diagrammatic view of my invention carried out in a vertical type of boiler.

1 is the boiler shell of a vertical boiler, 2 the burner, 3 the flue for the products of combustion, 4 a vapor dome near the bottom of the boiler, 5 a vapor lift tube provided with the usual orifice 6 above the liquid line in the vapor dome. The vapor lift tube connects with the liquid heat exchanger 7 near the top of the boiler and in the vapor space of the boiler. The vapor lift tube continues into the heat exchanger as the weak liquor tube 8.

The absorber is diagrammatically represented in the drawings, the top of the absorber by the reference character 9 and the bottom part of the absorber by the reference character 10. The absorber may be of any desired type, such as the cascade type, the tube type or any other form. The rich liquor flows out of the bottom of the absorber through the rich liquor tube 11. This rich liquor tube in the heat exchanger 7 jackets or surrounds the weak liquor tube 8. This heat exchanger is of sufficient length so as to elevate the temperature of the rich liquor as it pours into the top of the boiler to a temperature at which the ammonia will vaporize at the concentration and the pressure conditions at the top of the boiler. As the rich liquor passes down in the boiler due to the circulation brought about by the vapor lift, the liquor will be increasingly heated by the heat exchange between the rich liquor and the contents of the vapor lift tube and by the hot vapors passing up through the contents of the boiler, and by the products of combustion in the combustion flue. In short, there is present in the boiler itself a triple heat exchanger. The heat transfer takes place between fluids that have relatively small disparity in temperature and, consequently, the heat exchange is most efficient thermodynamically considered.

The vapor lift operates in the usual way so far as the vapor dome and the orifice in the vapor tube are concerned. The hot vapors, both ammonia and water, collect in the vapor dome and some of these vapors pass through the orifice in the vapor lift tube and associate with the hot weak liquors which have entered the tube through the open bottom of the tube. The combination of light vapor and heavier liquid makes the contents of the vapor tube of less specific gravity than the contents of the boiler. In other words, the boiler and the vapor lift tube together form a U-tube and the pressure of the liquid in the boiler will counterbalance the pressure of the vapor and liquid in the vapor tube and the weak liquor tube continuation thereof. The weight of the contents of one leg of the U-tube will counterbalance the weight of the contents of the other leg of the tube, that is, the boiler contents will counterbalance the mixed contents of the vapor lift tube and weak liquor tube continuation thereof. Inasmuch as the mixed contents of the one leg of the tube is considerably lighter per cubic unit of space than the contents of the other leg of the tube the fluid in the vapor lift tube and the continuation thereof will reach quite a bit higher than the level of the liquid in the boiler. I find that if the top of the absorber is about three inches higher than the liquid level in the boiler the apparatus will work very well and efficiently.

By reason of the cooling of the vapors and the weak liquors in the vapor lift tube, the vapors are substantially all condensed or absorbed in the weak liquor before it passes out of the boiler. The ammonia vapor will be absorbed in the weak liquor and the water vapor will be condensed. There is not sufficient increase of the ammonia concentration in the weak liquor to in any substantial degree impair the function of the weak liquor when it comes to perform its absorbing operation in the absorber.

Figure 2:
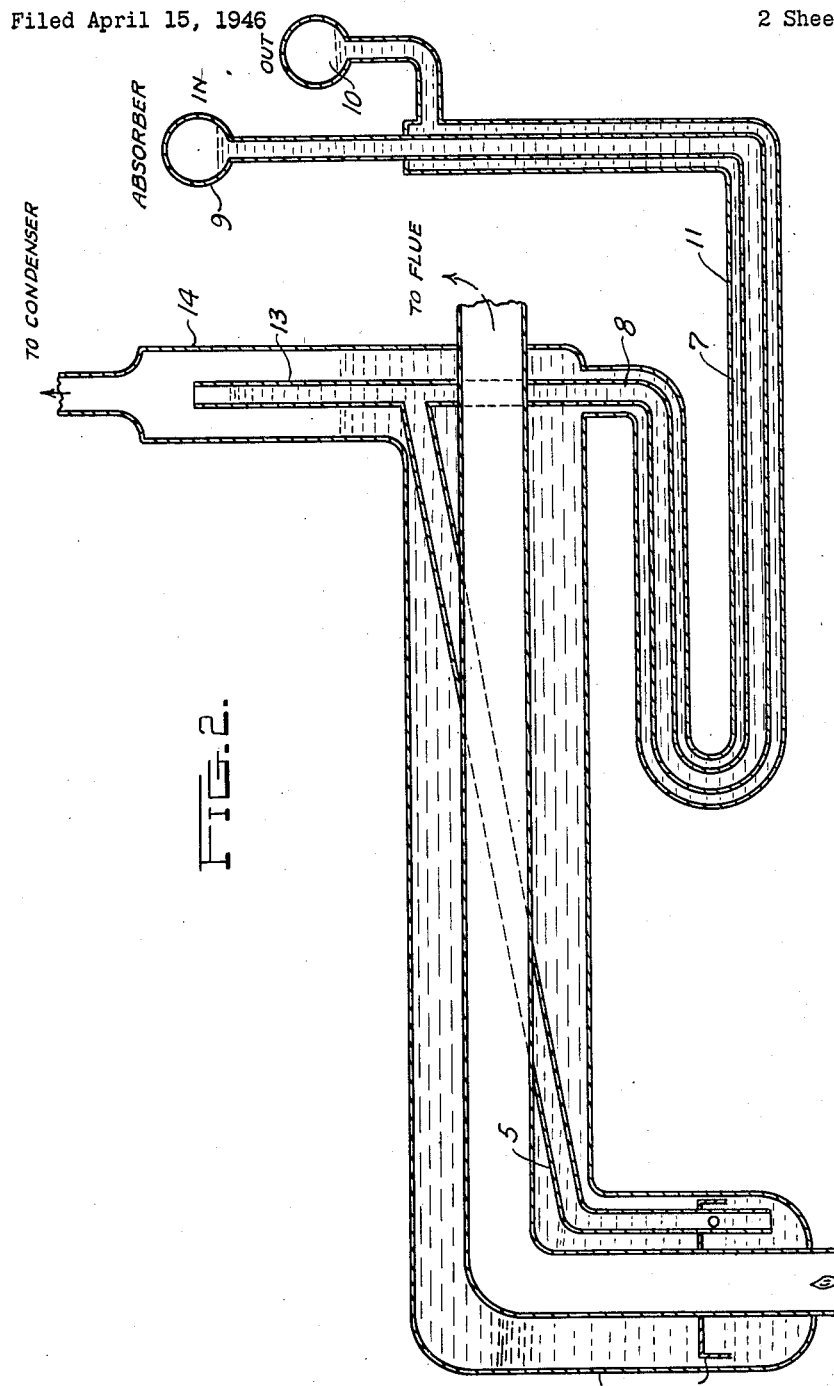
Fig. 2 is a diagrammatic view of my invention carried out in a boiler, the major portion of which is the horizontal type.

In the form of the invention shown in Fig. 2 the boiler lies largely in the horizontal position. However, the hot end of the boiler has an angular elbow portion 12 to provide a suitable receptacle for the separation of the hot weak liquors and to accommodate the vapor dome 4. The vapor lift tube 5 passes up through the vertical portion of the boiler and thence obliquely upwardly through the horizontal portion of the boiler, then out the cooler end of the boiler by a continuation, which is the weak liquor tube 8, and thence through the heat exchanger 7 to the top of the absorber 9. The rich liquor tube leads from the bottom of the absorber 10 to the heat exchanger where the rich liquor tube is jacketed about the weak liquor tube. This is entirely the same principle of operation as already described in connection with the vertical boiler. The heat exchanger is of sufficient capacity and length to heat the rich liquor to the point of vaporization at the existing concentration and pressure when it enters the cooler end of the boiler. The same triple heat exchange takes place in this horizontal boiler as with the vertical boiler, namely: the heat of the hot weak liquor, the heat of the hot vapors generated at the hot end of the boiler and the heat of the products of combustion is transferred to the cooler rich liquor flowing counterwise and under conditions of not too great disparity of temperatures of the several fluids so as to get heat exchange under conditions that are most efficient, thermodynamically considered.

The stand pipe 13 is a branch of the vapor tube 5 (Fig. 2) and this leads up into the stand pipe 14 of the boiler. The purpose of this vapor tube stand pipe is to allow exhaust of any non-condensable gases that may be in the fluid of the vapor lift tube, such as some trapped inert gases, hydrogen or nitrogen, that may be used in the circulation between the evaporator and absorber. The weak liquor standing in the upper part of the stand pipe will be in contact with ammonia vapors and may absorb some of these vapors. In so doing the weak liquor becomes lighter than the weak liquor flowing in the vapor lift tube and will, therefore, remain at the upper part of the stand pipe and not mix with the weak liquor in circulation. As the stand pipe shown is not essential to the normal functioning of the device it might be left off but it is preferred that it be shown.

Vapor lift tube 5 could be replaced in the cooler end of the boiler by an annulus or jacket surrounding the boiler shell 1, thus presenting a larger surface to facilitate heat transfer. Such an annulus I consider a "tube" within the language of some of the claims which specify in words a "vapor lift tube."

I claim:

1. In a continuous absorption refrigeration system of the equalized pressure type, the combination of a generator, a heater therefore located at one end of the generator thereby providing a hot zone at this end of the generator and a cooler zone at the other end of the generator, an absorber, tubing connecting the bottom of the absorber with the cooler end of the generator, a vapor collector located within the generator at the hot end of the generator, and a vapor lift tube and condensing means passing from said collector through the generator and thence out of the cooler end of the generator to the top of the absorber, the said vapor lifting tube affording a continuous mixed liquid and gas stream flowing from the hot end of the generator, without vapor and liquid separation, directly to the upper end of the absorber, said stream in the tube passing through the cooler rich liquor coming from the absorber thereby to condense and absorb the vapor as the liquid stream passes to the absorber.

2. The combination claimed in claim 1 with the vapor lift passing in heat transfer relation with the contents of the generator in countercurrent to the incoming rich liquor.

3. The combination claimed in claim 1 in which the generator has a major horizontal portion and an elbow portion passing downwardly from the horizontal portion, the said vapor lift including a tube passing from the downwardly directed portion of the generator up through the elbow portion and thence in heat exchange relation with the horizontal portion of the generator and then connecting with that portion of said tubing that leads to the top of the absorber and carries the weak liquor.

4. The combination claimed in claim 1 in which the generator has a major horizontal portion and an elbow portion passing downwardly from the horizontal portion, the said vapor lift including a tube passing from the downwardly directed portion of the generator up through the elbow portion and thence in heat exchange relation with the horizontal portion of the generator and then connecting with that portion of said tubing that leads to the top of the absorber and carries the weak liquor, the said generator having at the cool end thereof a stand pipe and the vapor tube having a branch pipe leading from the main run of the tube and forming a separate stand pipe within the generator stand pipe and which is open at its upper end to permit the exhaustion of non-condensable gases collecting in the vapor tube stand pipe.

5. In a continuous absorption refrigeration system of the equalized pressure type, the combination of a generator, with a heater therein providing a hot zone adjacent the heater and a cooler zone remote therefrom, an absorber, tubing connecting the bottom of the absorber with the cooler zone of the generator, and a vapor lift having a vapor generator and collector in the hot zone of the generator, the vapor tube passing directly from the collector to the top of the absorber in heat exchange relation with the contents of the generator, leaving the cooler end of the generator and passing in heat exchange relation with the tubing from the absorber bearing the rich cool liquor, the said heat exchanger thus formed being of such length and capacity as to elevate the temperature of the rich liquor to a point, when it enters the generator at the cool end, that the ammonia in the rich liquor is at a vaporizing temperature under the pressure and concentration conditions present.

WALTER L. EDEL.

REFERENCES CITED

The following references are of record in the file of this patent:

UNITED STATES PATENTS

| Number | Name | Date |
|---|---|---|
| 1,693,553 | Munters | Nov. 27, 1928 |
| 1,915,693 | Randel | June 27, 1933 |
| 2,354,982 | Bikkers | Aug. 1, 1944 |

FOREIGN PATENTS

| Number | Country | Date |
|---|---|---|
| 315,292 | Great Britain | July 11, 1929 |
| 422,313 | Great Britain | Jan. 9, 1935 |